United States Patent
Chandramouli et al.

(10) Patent No.: US 9,781,770 B2
(45) Date of Patent: Oct. 3, 2017

(54) METHOD TO ADDRESS INFREQUENT TRANSMISSION

(75) Inventors: Devaki Chandramouli, Plano, TX (US); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 307 days.

(21) Appl. No.: 14/396,152

(22) PCT Filed: Apr. 23, 2012

(86) PCT No.: PCT/US2012/034637
§ 371 (c)(1),
(2), (4) Date: Oct. 22, 2014

(87) PCT Pub. No.: WO2013/162495
PCT Pub. Date: Oct. 31, 2013

(65) Prior Publication Data
US 2015/0139095 A1    May 21, 2015

(51) Int. Cl.
*H04W 76/06* (2009.01)
(52) U.S. Cl.
CPC ....... *H04W 76/066* (2013.01); *H04W 76/062* (2013.01); *H04W 76/068* (2013.01)
(58) Field of Classification Search
CPC ............. H04W 76/068; H04W 76/062; H04W 76/066
See application file for complete search history.

(56) References Cited

U.S. PATENT DOCUMENTS

| | | | |
|---|---|---|---|
| 2007/0259673 A1 | 11/2007 | Willars et al. | |
| 2010/0067400 A1 | 3/2010 | Dolganow et al. | |
| 2011/0255471 A1 | 10/2011 | Sundell et al. | |
| 2012/0027025 A1* | 2/2012 | Bekiares | H04L 47/745 370/431 |
| 2012/0082029 A1 | 4/2012 | Liao | |
| 2012/0182859 A1* | 7/2012 | Ikeda | H04L 1/1835 370/216 |
| 2013/0258967 A1* | 10/2013 | Watfa | H04W 76/00 370/329 |
| 2016/0183156 A1* | 6/2016 | Chin | H04W 36/0022 370/331 |

FOREIGN PATENT DOCUMENTS

WO    WO 2011/098150 A1    8/2011

OTHER PUBLICATIONS

R2-104562; LG Electronics Inc.; "RRC Connection Release for MTC Devices"; 3GPP TSG-RAN WG2 #71; Madrid, Spain, Aug. 23-28, 2010.
(Continued)

*Primary Examiner* — Jae Y Lee
(74) *Attorney, Agent, or Firm* — Squire Patton Boggs (US) LLP

(57) ABSTRACT

Communication systems, such as an evolved packet system, may benefit from methods for addressing infrequent transmissions. In particular, certain communication systems in which machine type communication devices are deployed may benefit from a machine type communication feature for infrequent transmission. A method for providing such a feature can include negotiating at least one characteristic of a bearer. The method can also include deactivating the bearer based on the at least one characteristic.

42 Claims, 6 Drawing Sheets

(56) References Cited

OTHER PUBLICATIONS

European Search Report application No. 12875494.2 dated Nov. 16, 2015.
International Search Report and Written Opinion dated Jul. 27, 2012 corresponding to International Patent Application No. PCT/US2012/034637.
3GPP TS 23.682 V11.0.0 (Mar. 2012), Technical Specification, 3rd Generation Partnership Project; Technical Specification Group Services and System Aspects; Architecture Enhancements to Facilitate Communications with Packet Data Networks and Applications (Release 11), Mar. 2012, 24 pages.
3GPP TS 23.401 V11.1.0 (Mar. 2012), Technical Specification, 3rd Generation Partnership Project; Technical Specification Group Services and System Aspects; General Packet Radio Service (GPRS) Enhancements for Evolved Universal Terrestrial Radio Access Network (E-UTRAN) access (Release 11), Mar. 2012, 284 pages.
D. Nash, "ODETTE File Transfer Protocol," Network Working Group, Request for Comments: 2204 (RFC2204), Sep. 1997, 75 pages.

\* cited by examiner

METHOD TO ADDRESS INFREQUENT TRANSMISSION

BACKGROUND

Field

Communication systems, such as an evolved packet system, may benefit from methods for addressing infrequent transmissions. In particular, certain communication systems in which machine type communication devices are deployed may benefit from a machine type communication feature for infrequent transmission.

Description of the Related Art

The evolved packet system (EPS), the successor of general packet radio system (GPRS), provides radio interfaces and packet core network functions for broadband wireless data access. EPS core network functions include the mobility management entity (MME), the packet data network gateway (PDN-GW) and the Serving Gateway (S-GW). An example of an evolved packet core architecture is illustrated in FIG. 1 and is described by third generation partnership project (3GPP) technical specification (TS) 23.401, which is incorporated herein by reference in its entirety. A common packet domain core network can be used for both radio access networks (RANs), the global system for mobile communication (GSM) enhanced data rates for GSM evolution (EDGE) radio access network (GERAN) and the universal terrestrial radio access network (UTRAN).

For machine-type-communication (MTC) a functional entity called MTC interworking function (MTC-IWF) and several new interfaces, including S6m, Tsp, Tsms, T5a/b/c and T4, have been introduced to the 3GPP architecture. FIG. 2 illustrates machine-type-communication additions to the 3GPP architecture, as well as the various interfaces identified. The MTC-IWF and the new interfaces in 3GPP Release 11 (Rel 11) can, for example, enable triggering of devices with or without a mobile subscriber integrated services digital network number (MSISDN) from an internal or external MTC server. The triggering of the devices may be, for example, in order to establish a packet data network (PDN) connection and/or packet data protocol (PDP) context. A 3GPP architecture for machine-type communication is discussed in 3GPP TS 23.682, which incorporated herein by reference in its entirety.

Certain MTC devices, such as smart meters, may send and/or receive infrequently compared to devices such as mobile phones. Conventionally, transmission of data in such systems is performed using an established bearer. Thus, the bearer remains active until the user equipment or network explicitly initiates deactivation of the established bearer.

SUMMARY

According to certain embodiments, a method includes negotiating at least one characteristic of a bearer. The method also includes deactivating the bearer based on the at least one characteristic.

In certain embodiments, an apparatus includes at least one processor and at least one memory including computer program instructions. The at least one memory and the computer program instructions are configured to, with the at least one processor, cause the apparatus at least to negotiate at least one characteristic of a bearer. The at least one memory and the computer program instructions are also configured to, with the at least one processor, cause the apparatus at least to deactivate the bearer based on the at least one characteristic.

An apparatus, according to certain embodiments, includes negotiating means for negotiating at least one characteristic of a bearer. The apparatus also includes deactivating means for deactivating the bearer based on the at least one characteristic.

A non-transitory computer readable medium, in certain embodiments, is encoded with instructions that, when executed in hardware, perform a process. The process includes negotiating at least one characteristic of a bearer. The process also includes deactivating the bearer based on the at least one characteristic.

BRIEF DESCRIPTION OF THE DRAWINGS

For proper understanding of the invention, reference should be made to the accompanying drawings, wherein.

DETAILED DESCRIPTION

A machine type communication (MTC) feature for infrequent transmission can be used, for example, with MTC devices that are expected to send or receive data infrequently, with a long period between consecutive data transmissions.

For an infrequent transmission MTC feature, the network can reserve resources only when transmission occurs. Moreover, when there is data to transmit and/or receive, the MTC device can connect to the network, transmit and/or receive the data, then, following successful transmission/reception, return to a state in which the MTC device is not attached to the network.

This feature can be used in various ways. For example, this feature can be used by a device that needs to transmit a file infrequently. The file may be a large file, such as a log file. In another example, a user may need access to a network only for a defined period, such as when prepaid access is obtained for a specified duration.

Figure 1:
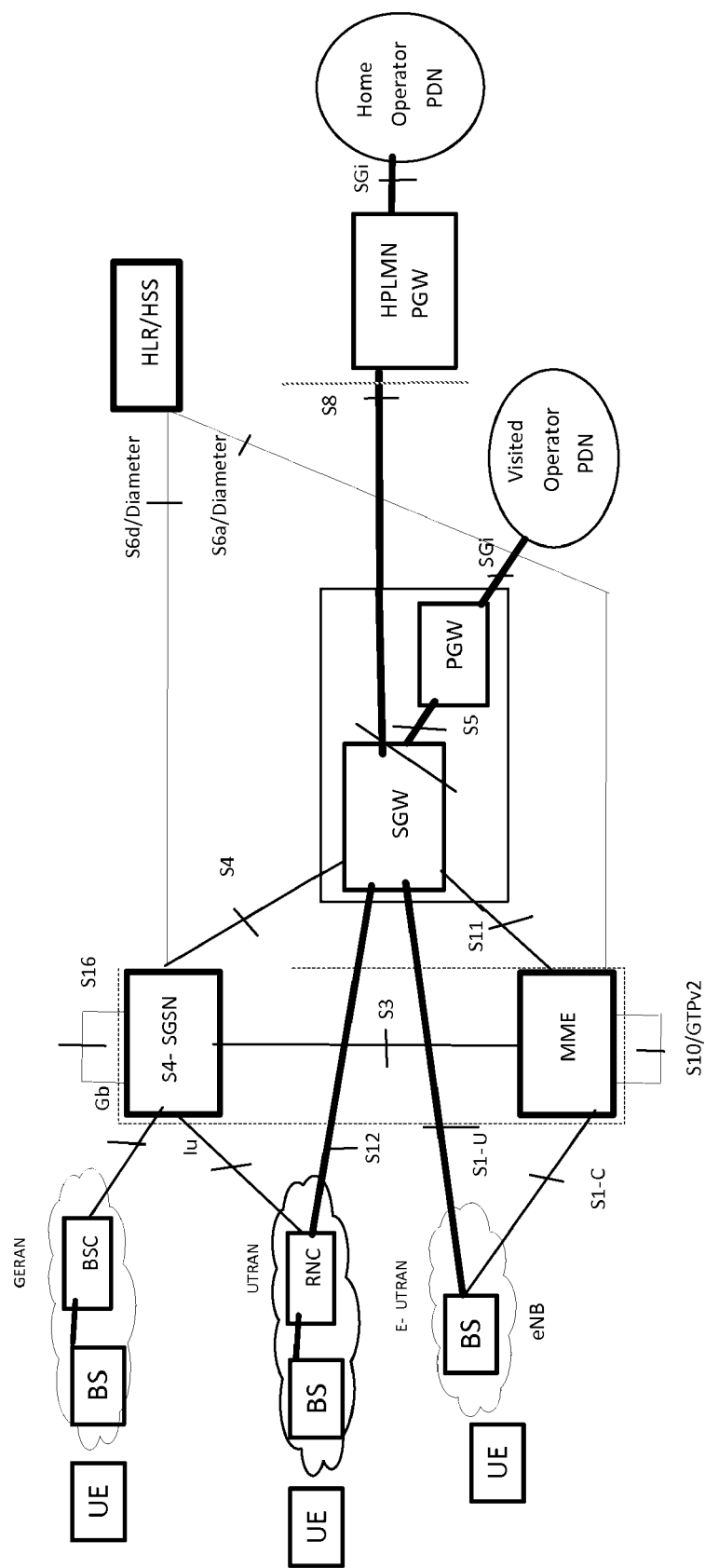
FIG. 1 illustrates an evolved packet core architecture.
Figure 2:
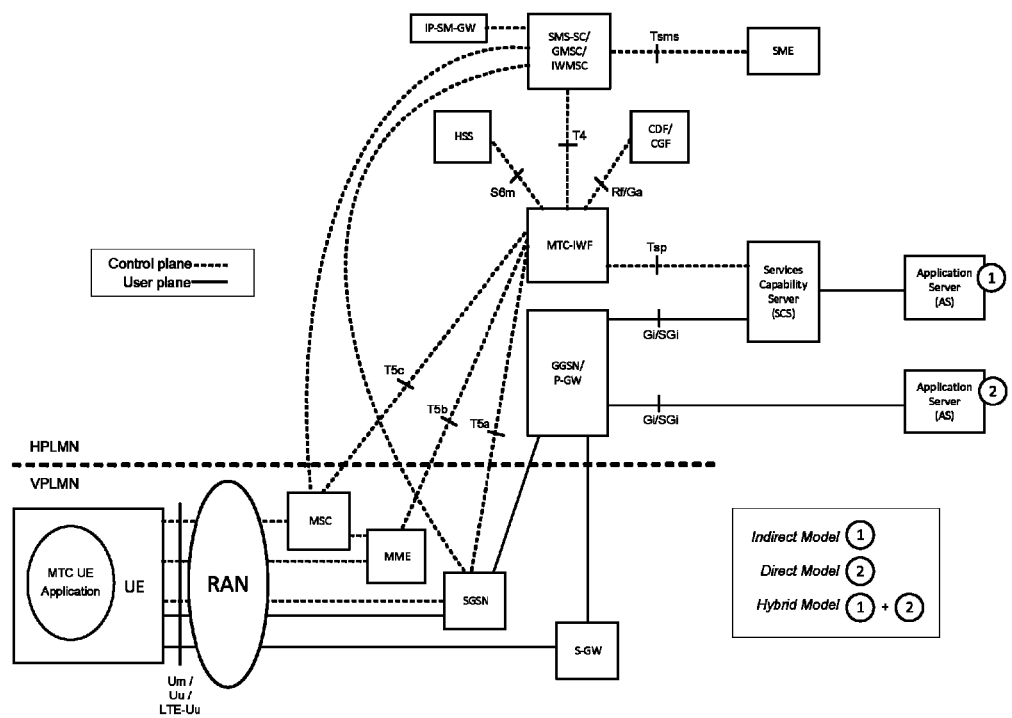
FIG. 2 illustrates machine-type-communication additions to a third generation partnership project architecture.
Figure 3:
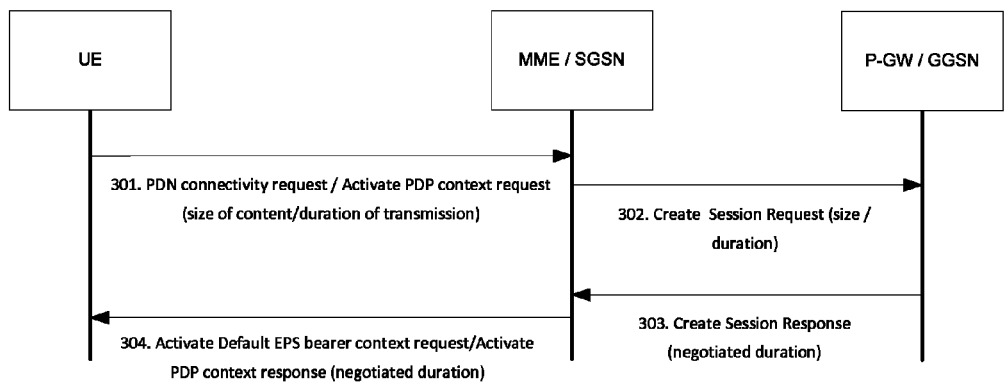
FIG. 3 illustrates a signal flow according to certain embodiments.
Figure 4:
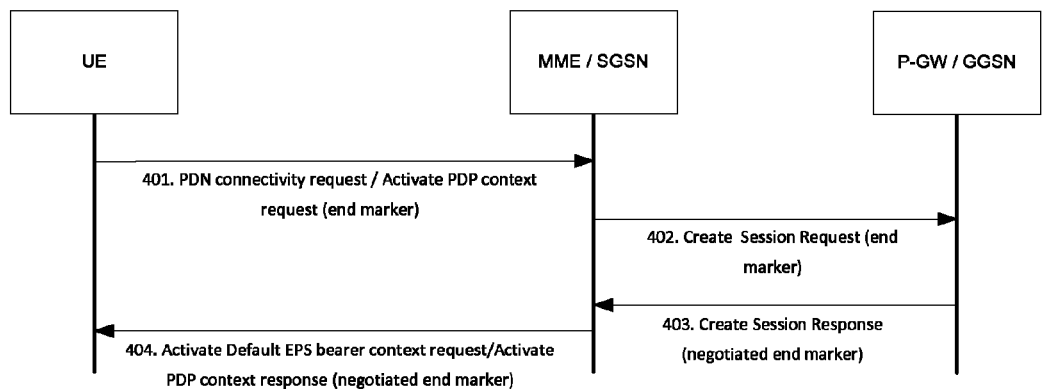
FIG. 4 illustrates another signal flow according to certain embodiments.

Certain embodiments, therefore, provide for an infrequent transmission feature. At least one characteristic of the bearer can be negotiated. For example, as shown in FIG. 3, a validity time or duration can be negotiated. Alternatively, as shown in FIG. 4, an end-marker for the bearer can be negotiated. This negotiation can take place when the bearer is being established. The negotiated characteristic can serve to provide an indication to deactivate the bearers with or without an explicit signaling procedure on the control plane. The duration for the bearer can also be limited by a subscription for the device.

If the user equipment (UE) and the network negotiate validity time for the bearer, then in certain embodiments the network and the UE can locally deactivate the bearers without an explicit signaling procedure. Alternatively, if signaling traffic is not a concern, the network may also initiate explicit signaling procedure to deactivate the bearer and/or detach the UE. If the UE and network negotiated an end-marker for the bearer, then in certain embodiments the UE or network, if known by the network, can indicate this "end marker" to the network. The end marker can be detected by a deep packet inspection (DPI) function within the P-GW/GGSN or can be an explicit part of the user plane packets, such as a particular GTP-U header. This indication could be sent from UE to network in an acknowledgement to the last received or sent application packet.

Alternatively the network, if possible, can also mark the last packet sent to the UE. Once the network receives this "end marker" indication or detects end of transmission itself, then it can initiate deactivation of established bearer with or without explicit signaling procedure. Similarly, the UE can initiate deactivation of established bearer with or without explicit signaling procedure.

Furthermore, in long term evolution (LTE), when the UE and network deactivate the packet data network (PDN) connection, if it is the last PDN connection, the network and UE can perform local detach or it can perform detach using explicit signaling procedure. This may allow the UE to return to a state in which the device is not attached to the network upon completion of transmission at the same time retaining the "always on" feature associated with LTE.

The above principles can be applied in general packet radio service (GPRS), universal mobile telecommunications system (UMTS) with respect to a packet data protocol (PDP) context activation procedure, and LTE with respect to a PDN connection establishment procedure. The above principles can also be applied to negotiating the duration for a UE being attached to a network.

As mentioned above, FIGS. 3 and 4 describe two alternatives. According to the alternative illustrated in FIG. 3, there can be negotiation of duration, or validity time for the bearer, when the bearer is being established. Alternatively, as described in FIG. 4, there can be negotiation of the end-marker to indicate an end of transmission when the bearer is being established. In this alternative, the UE can either inform the network about the size of the transmission needed or the duration for the transmission using the bearer to be established.

If the UE provides the size of the content to be transmitted, then the P-GW/GGSN can compute the expected duration based on the bandwidth to be allocated for the bearer. For instance, in EPC, P-GW can take APN-AMBR for a non-guaranteed bit rate (non-GBR) bearer, MBR for guaranteed bit rate (GBR) bearer, packet delay budget, GBR vs non-GBR bearer into account when computing the expected duration for the bearer. Some safety duration can then be added to the estimated duration time, at least for non-GBR bearers, to avoid a situation in which the bearer is terminated before the transmission ends. This estimated duration can be provided to the UE as a negotiated duration for the bearer.

Alternatively, if the UE provides the duration for the transmission, then the P-GW/GGSN can acknowledge this as a negotiated duration to the UE. This negotiated duration could be limited by subscription for the device.

FIG. 3 illustrates a signal flow according to certain embodiments. As shown in FIG. 3, at 301, a UE can initiate a PDN connectivity request and/or activate a PDP context request and provides the size of the content or the duration of transmission for the bearer. Then, at 302, the MME and/or serving general packet radio service (GPRS) support node (SGSN) can include the requested size of the content and/or duration of transmission for the bearer in the create session request message to the P-GW and/or gateway GPRS support node (GGSN).

If the size of the content was provided, then the P-GW/GGSN can estimate the expected duration of the bearer and can provide that as the negotiated duration in a create session response message, at 303, to the MME/SGSN. Otherwise, if the requested duration was provided, then the P-GW/GGSN can acknowledge the expected duration of the bearer and, at 303, provide that as the negotiated duration in the create session response message to the MME/SGSN. At 304, the MME/SGSN can provide the negotiated duration in an activate default EPS bearer context request or an activate PDP context response message to the UE.

The network and the UE can start running a timer, with a value corresponding to the negotiated duration, after the transmission of first uplink packet. Upon expiry of this timer, the UE and the network can locally deactivate the established bearer without any explicit signaling procedure. In LTE, if this is the only bearer that was established, then the UE and network can also perform local detach. The network can mark the UE context to be detached and the UE can move to an EMM-DEREGISTERED state. Alternatively, upon expiry of this timer, the P-GW/GGSN can initiate an explicit signaling procedure to deactivate the bearer. In LTE, if this is the only bearer that was established, then the MME can initiate an explicit signaling procedure to detach the UE. This can cause the network to mark the UE context to be detached and the UE can move to an EMM-DEREGISTERED state.

FIG. 4 illustrates another signal flow according to certain embodiments. In this alternative, the UE can negotiate the end of transmission with the network when the bearer is being established. This can involve negotiating an end marker that the UE can transmit, for example when it completes the transmission, and the P-GW/GGSN can recognize, such as with the help of a deep packet inspection (DPI) function. For instance, if file transfer protocol (ftp) is being used by the application running in the device, end marker could be "EFID" to indicate the end of file.

As shown in FIG. 4, at 401, the user equipment can initiate a PDN connectivity request or an activate PDP context request and can provide an end marker for the bearer. Then, at 402, the MME/SGSN can include the requested end marker for the bearer in the create session request message to the P-GW/GGSN. The P-GW/GGSN can acknowledge the end marker for the bearer and can, at 403, provides that end marker as a negotiated end marker in the create session response message to the MME/SGSN. After that, at 404, the MME/SGSN can provide the negotiated end marker in an activate default EPS bearer context request or activate PDP context response message to the UE.

Upon completion of transmission, the UE can transmit the end marker in the last exchanged user plane packet. UE and network will then locally deactivate the established bearer without an explicit signaling procedure. In LTE, if this is the only bearer that was established, then the UE and network can also perform local detach. The network can mark the UE context to be detached and the UE can move to an EMM-DEREGISTERED state. Alternatively, upon receiving the end marker in the last exchanged user plane packet, the P-GW/GGSN can initiate an explicit signaling procedure to deactivate the bearer. In LTE, if this is the only bearer that was established, then the MME can initiate an explicit signaling procedure to detach the UE. This can cause the network to mark the UE context to be detached and the UE can move to an EMM-DEREGISTERED state.

Certain embodiments, therefore, can provide functionality for MTC devices that transmit data infrequently as well as for normal data users who need data connection only for a defined duration, such as users who operate similar to signing up for 30 minutes of WiFi connection. Moreover, certain embodiments can minimize necessary signaling by avoiding a need for explicit signaling to provide deactivation. Moreover, certain embodiments minimize the network context for devices that may have long periods between activity, which may include durations of minutes, hours, weeks, months, or years.

In certain embodiments, a device can be moved to a detached state after transmission is complete, for example in LTE, if it is the last bearer, the UE and the network can locally detach. This can also enhance a user's location privacy.

Figure 5:
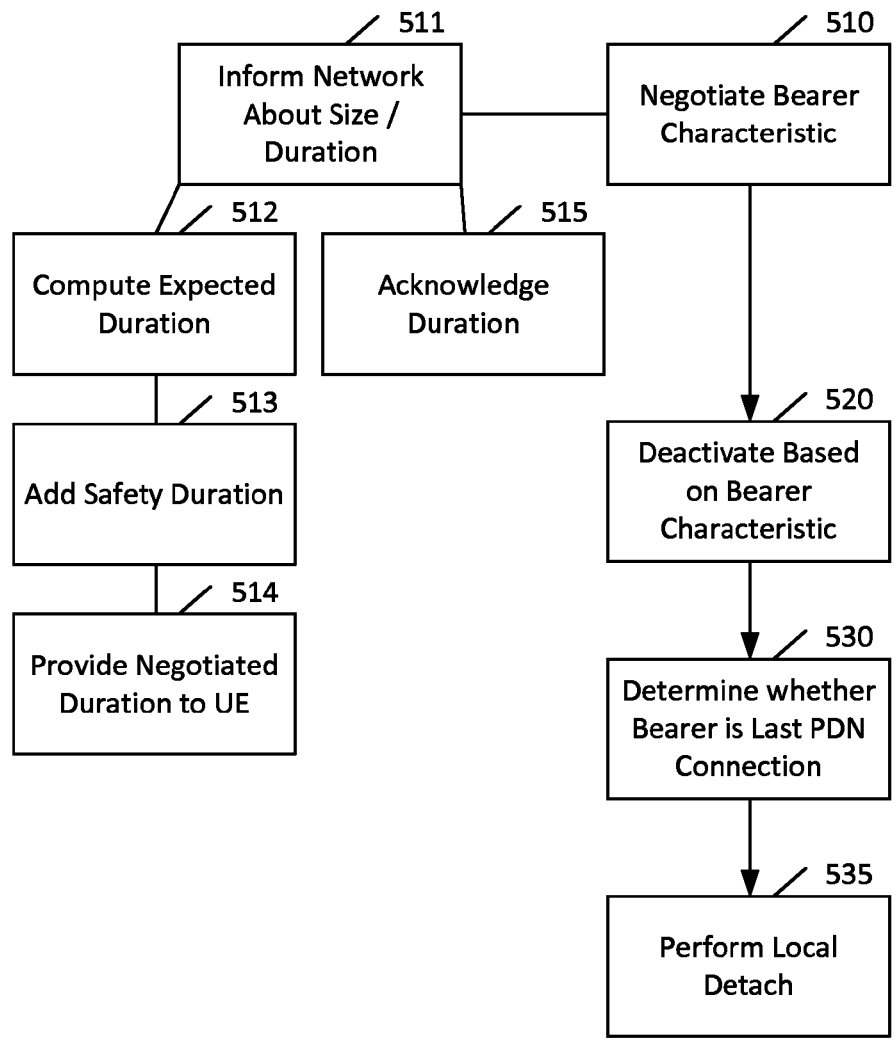
FIG. 5 illustrates a method according to certain embodiments.

FIG. 5 illustrates a method according to certain embodiments. As shown in FIG. 5, a method can include, at 510, negotiating at least one characteristic of a bearer. The method of FIG. 5 can be performed the devices illustrated and described in FIG. 6 below.

The negotiating can include negotiating between the user equipment and the network. Moreover, the negotiating can be performed when establishing the bearer. The at least one characteristic can include at least one of a validity time of the bearer or an end-marker of the bearer.

The negotiating can include, at 511, informing the network regarding at least one of a size of a transmission needed or a duration for the transmission. The negotiating can also include, at 512, computing, by the network, an expected duration based on a bandwidth to be allocated to the bearer. The negotiating can further include, at 513, adding a safety duration to a calculation based on bit rate to determine the expected duration. Furthermore, the negotiating can include, at 514, providing the expected duration to a user equipment (UE) as the negotiated duration. Additionally, the negotiating can include, at 515, acknowledging a duration for transmission provided from a user equipment as a negotiated duration.

The negotiating can more particularly include sending, in a request, at least one of a size of content, a duration of a transmission, or an end marker, wherein the request comprises at least of a packet data network connectivity request, an activate packet data protocol context request, or a create session request. Also, the negotiating can include sending a message to a user equipment, wherein the message includes at least one of a negotiated end marker or a negotiated duration, wherein the message includes at least one of an activate default evolved packet system bearer context request or an activate packet data protocol context response, as respectively illustrated in FIGS. 3 and 4 above.

The method can further include, at 520, deactivating the bearer based on the at least one characteristic. The deactivating can be performed either with or without an explicit signaling procedure on a control plane.

When the at least one characteristic includes an end marker, the deactivating the bearer can include at least one of deactivating the bearer upon sending the end marker, receiving the end marker, or confirming receipt of the end marker. For example, the deactivating can be performed responsive to an end marker exchanged in a user plane packet.

The method can also include, at 530, determining whether the bearer is a last packet data network connection and, at 535, performing a local detach when the bearer is the last packet data network connection.

Figure 6:
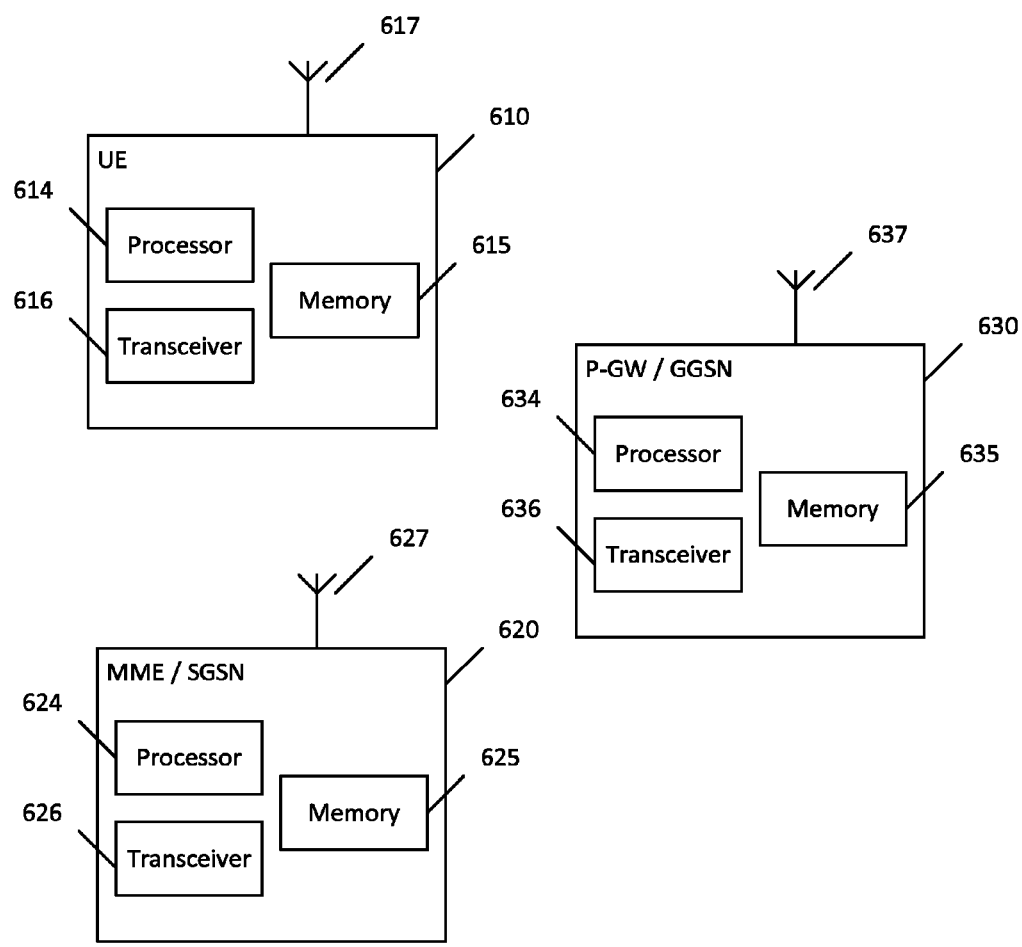
FIG. 6 illustrates a system according to certain embodiments.

FIG. 6 illustrates a system according to certain embodiments of the invention. In one embodiment, a system may include two devices, such as, for example, UE 610, MME/SGSN 620, and P-GW/GGSN 630. Each of these devices may include at least one processor, respectively indicated as 614, 624, and 634. At least one memory is provided in each device, and indicated as 615, 625, and 635, respectively. The memory may include computer program instructions or computer code contained therein. Transceivers 616, 626, and 636 are provided, and each device may also include an antenna, respectively illustrated as 617, 627, and 637. Other configurations of these devices, for example, may be provided. For example, UE 610, MME/SGSN 620, and P-GW/GGSN 630 may be configured for wired communication, rather than wireless communication, and in such a case antennas 617, 627, and 637 would illustrate any form of communication hardware, without requiring a conventional antenna.

Transceivers 616, 626, and 636 can each, independently, be a transmitter, a receiver, or both a transmitter and a receiver, or a unit or device that is configured both for transmission and reception.

Processors 614, 624, and 634 can be embodied by any computational or data processing device, such as a central processing unit (CPU), application specific integrated circuit (ASIC), or comparable device. The processors can be implemented as a single controller, or a plurality of controllers or processors.

Memories 615, 625, and 635 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate therefrom. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 610, MME/SGSN 620, and P-GW/GGSN 630, to perform any of the processes described above (see, for example, FIGS. 3-5). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 6 illustrates a system including a UE, MME/SGSN, and P-GW/GGSN, embodiments of the invention may be applicable to other configurations, and configurations involving additional elements, as illustrated herein.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
  negotiating at least one characteristic of a bearer between a user equipment and a core network, wherein the negotiating is performed when establishing the bearer; and deactivating the bearer based on the at least one characteristic, the at least one characteristic being at least one of a validity time of the bearer and an end-marker of the bearer.

2. The method of claim 1, wherein the deactivating is performed without an explicit signaling procedure on a control plane.

3. The method of claim 1, wherein the at least one characteristic comprises an end marker, and wherein the deactivating the bearer comprises deactivating the bearer upon at least one of sending the end marker, receiving the end marker, or confirming receipt of the end marker.

4. The method of claim 1, wherein the at least one characteristic comprises an end marker, wherein the deactivating depends on at least one of detection of the end of transmission by a deep packet inspection function or detection of a predetermined header of a user plane packet.

5. The method of claim 1, wherein the deactivating comprises an explicit signaling procedure on a control plane.

6. The method of claim 1, further comprising:
determining whether the bearer is a last packet data network connection; and
performing a local detach when the bearer is the last packet data network connection.

7. The method of claim 1, wherein the negotiating comprises user equipment informing the network regarding at least one of a size of a transmission needed or a duration for the transmission.

8. The method of claim 1, wherein the negotiating comprises computing, by the network, an expected duration based on a bandwidth to be allocated to the bearer.

9. The method of claim 8, further comprising:
adding a safety duration to a calculation based on bit rate to determine the expected duration.

10. The method of claim 8, further comprising:
providing the expected duration to a user equipment as the negotiated duration.

11. The method of claim 1, wherein the negotiating comprises acknowledging a duration for transmission provided from a user equipment as a negotiated duration.

12. The method of claim 1, wherein the negotiating comprises sending a message to a user equipment, wherein the message includes at least one of a negotiated end marker or a negotiated duration, wherein the message includes at least one of an activate default evolved packet system bearer context request or an activate packet data protocol context response.

13. The method of claim 1, wherein the negotiating comprises:
sending, in a request, at least one of a size of content, a duration of a transmission, or an end marker, wherein the request comprises at least of a packet data network connectivity request, an activate packet data protocol context request, or a create session request.

14. The method of claim 1, wherein the deactivating is performed responsive to an end marker exchanged in a user plane packet.

15. An apparatus, comprising:
at least one processor; and
at least one memory including computer program instructions,
wherein the at least one memory and the computer program instructions are configured to, with the at least one processor, cause the apparatus at least to
negotiate at least one characteristic of a bearer between a user equipment and a core network, wherein negotiating is performed when establishing the bearer; and
deactivate the bearer based on the at least one characteristic, the at least one characteristic being at least one of a validity time of the bearer and an end-marker of the bearer.

16. The apparatus of claim 15, wherein the at least one memory and the computer program instructions are configured to, with the at least one processor, cause the apparatus at least to deactivate without an explicit signaling procedure on a control plane.

17. The apparatus of claim 15, wherein the at least one characteristic comprises an end marker, and wherein the at least one memory and the computer program instructions are configured to, with the at least one processor, cause the apparatus at least to deactivate the bearer upon at least one of sending the end marker, receiving the end marker, or confirming receipt of the end marker.

18. The apparatus of claim 15, wherein the at least one characteristic comprises an end marker, wherein the deactivating depends on at least one of detection of the end of transmission by a deep packet inspection function or detection of a predetermined header of a user plane packet.

19. The apparatus of claim 15, wherein the at least one memory and the computer program instructions are configured to, with the at least one processor, cause the apparatus at least to deactivate using an explicit signaling procedure on a control plane.

20. The apparatus of claim 15, wherein the at least one memory and the computer program instructions are further configured to, with the at least one processor, cause the apparatus at least to
determine whether the bearer is a last packet data network connection; and
perform a local detach when the bearer is the last packet data network connection.

21. The apparatus of claim 15, wherein the at least one memory and the computer program instructions are configured to, with the at least one processor, cause the apparatus at least to inform the network regarding at least one of a size of a transmission needed or a duration for the transmission while negotiating the at least one characteristic.

22. The apparatus of claim 15, wherein the at least one memory and the computer program instructions are configured to, with the at least one processor, cause the apparatus at least to compute, by the network, an expected duration based on a bandwidth to be allocated to the bearer while negotiating the at least one characteristic.

23. The apparatus of claim 22, wherein the at least one memory and the computer program instructions are configured to, with the at least one processor, cause the apparatus at least to add a safety duration to a calculation based on bit rate to determine the expected duration.

24. The apparatus of claim 22, wherein the at least one memory and the computer program instructions are configured to, with the at least one processor, cause the apparatus at least to provide the expected duration to a user equipment as the negotiated duration.

25. The apparatus of claim 15, wherein the at least one memory and the computer program instructions are configured to, with the at least one processor, cause the apparatus at least to acknowledge a duration for transmission provided from a user equipment as a negotiated duration while negotiating the at least one characteristic.

26. The apparatus of claim 15, wherein the at least one memory and the computer program instructions are configured to, with the at least one processor, cause the apparatus at least to send a message to a user equipment while negotiating the at least one characteristic, wherein the message includes at least one of a negotiated end marker or a negotiated duration, wherein the message includes at least one of an activate default evolved packet system bearer context request or an activate packet data protocol context response.

27. The apparatus of claim 15, wherein the at least one memory and the computer program instructions are configured to, with the at least one processor, cause the apparatus at least to send, in a request while negotiating the at least one characteristic, at least one of a size of content, a duration of a transmission, or an end marker, wherein the request comprises at least of a packet data network connectivity request, an activate packet data protocol context request, or a create session request.

28. The apparatus of claim 15, wherein the at least one memory and the computer program instructions are configured to, with the at least one processor, cause the apparatus at least to deactivate responsive to an end marker exchanged in a user plane packet.

29. A non-transitory computer readable medium encoded with instructions that, when executed in hardware, perform a process, the process comprising:
    negotiating at least one characteristic of a bearer between a user equipment and a core network, wherein the negotiating is performed when establishing the bearer; and
    deactivating the bearer based on the at least one characteristic, the at least one characteristic being at least one of a validity time of the bearer and an end-marker of the bearer.

30. The non-transitory computer readable medium of claim 29, wherein the deactivating is performed without an explicit signaling procedure on a control plane.

31. The non-transitory computer readable medium of claim 29, wherein the at least one characteristic comprises an end marker, and wherein the deactivating the bearer comprises deactivating the bearer upon at least one of sending the end marker, receiving the end marker, or confirming receipt of the end marker.

32. The non-transitory computer readable medium of claim 29, wherein the at least one characteristic comprises an end marker, wherein the deactivating depends on at least one of detection of the end of transmission by a deep packet inspection function or detection of a predetermined header of a user plane packet.

33. The non-transitory computer readable medium of claim 29, wherein the deactivating comprises an explicit signaling procedure on a control plane.

34. The non-transitory computer readable medium of claim 29, further comprising:
    determining whether the bearer is a last packet data network connection; and
    performing a local detach when the bearer is the last packet data network connection.

35. The non-transitory computer readable medium of claim 29, wherein the negotiating comprises informing the network regarding at least one of a size of a transmission needed or a duration for the transmission.

36. The non-transitory computer readable medium of claim 29, wherein the negotiating comprises computing, by the network, an expected duration based on a bandwidth to be allocated to the bearer.

37. The non-transitory computer readable medium of claim 36, further comprising:
    adding a safety duration to a calculation based on bit rate to determine the expected duration.

38. The non-transitory computer readable medium of claim 36, further comprising:
    providing the expected duration to a user equipment as the negotiated duration.

39. The non-transitory computer readable medium of claim 29, wherein the negotiating comprises acknowledging a duration for transmission provided from a user equipment as a negotiated duration.

40. The non-transitory computer readable medium of claim 29, wherein the negotiating comprises sending a message to a user equipment, wherein the message includes at least one of a negotiated end marker or a negotiated duration, wherein the message includes at least one of an activate default evolved packet system bearer context request or an activate packet data protocol context response.

41. The non-transitory computer readable medium of claim 29, wherein the negotiating comprises:
    sending, in a request, at least one of a size of content, a duration of a transmission, or an end marker, wherein the request comprises at least of a packet data network connectivity request, an activate packet data protocol context request, or a create session request.

42. The non-transitory computer readable medium of claim 29, wherein the deactivating is performed responsive to an end marker exchanged in a user plane packet.

* * * * *